US012655250B1

(12) United States Patent
Leguizamon et al.

(10) Patent No.: US 12,655,250 B1
(45) Date of Patent: Jun. 16, 2026

(54) FRONTAL POLYMERIZATION USING ENCAPSULATED CATALYSTS

(71) Applicant: National Technology & Engineering Solutions of Sandia, LLC, Albuquerque, NM (US)

(72) Inventors: Samuel C. Leguizamon, Albuquerque, NM (US); Brad H. Jones, Albuquerque, NM (US); Oleg Davydovich, Albuquerque, NM (US); Andrew J. Greenlee, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 530 days.

(21) Appl. No.: 18/218,921

(22) Filed: Jul. 6, 2023

(51) Int. Cl.
  *C08G 61/08* (2006.01)
  *B01J 31/22* (2006.01)
  (Continued)

(52) U.S. Cl.
  CPC .......... *C08G 61/08* (2013.01); *B01J 31/2278* (2013.01); *C08G 61/06* (2013.01);
  (Continued)

(58) Field of Classification Search
  CPC ........ C08G 61/08; C08G 61/06; C08G 77/04; C08G 77/08; B01J 31/28; B01J 31/24; B01J 31/2278
  See application file for complete search history.

(56) References Cited

U.S. PATENT DOCUMENTS 5,606,085 A * 2/1997 Bell ...................... C07F 11/005
                                                    502/152
6,518,330 B2 * 2/2003 White ................ B29D 30/0685
                                                    523/205
(Continued)

FOREIGN PATENT DOCUMENTS

JP        2016204428 A  * 12/2016

OTHER PUBLICATIONS

Rule,. J.D.; Brown, E.N.; Sottos, N.R., White, S.R.; Moore, J.S. Adv. Mater. 2005, 17(2), 205-208. (Year: 2005).*
(Continued)

*Primary Examiner* — Rip A Lee
(74) *Attorney, Agent, or Firm* — Kevin W. Bieg; Daniel J. Jenkins

(57) ABSTRACT

Frontal polymerization involves the propagation of a thermally driven polymerization wave through a monomer solution to rapidly generate high-performance polymeric materials with little energy input. The balance between latent catalyst activation and sufficient reactivity to sustain a front can be difficult to achieve and often results in systems with poor storage lives. This is of particular concern for frontal ring-opening metathesis polymerization (FROMP) where gelation occurs within a single day of resin preparation due to the highly reactive nature of Grubbs-type catalysts. The invention uses encapsulated catalysts to provide remarkable latency to frontal polymerization systems, with negligible differences in frontal velocities or thermomechanical properties of the resulting polymeric materials. FROMP systems with encapsulated catalyst particles are shown with storage lives exceeding eight months and front rates that increase over a two month period. Moreover, the generality of this encapsulation method is demonstrated by encapsulating a
(Continued)

Hoveyda-Grubbs 2 (HG2)

Polysulfone Encapuslant (PSU)

platinum catalyst for the frontal polymerization of silicones using hydrosilylation chemistries.

14 Claims, 8 Drawing Sheets

(51) Int. Cl.

| | | |
|---|---|---|
| *C08G 61/06* | (2006.01) | |
| *C08G 71/04* | (2006.01) | |
| C08G 77/04 | (2006.01) | |
| C08G 77/08 | (2006.01) | |

(52) U.S. Cl.
CPC .... *B01J 2231/323* (2013.01); *B01J 2231/543* (2013.01); *B01J 2531/821* (2013.01); *B01J 2531/828* (2013.01); *C08G 77/04* (2013.01); *C08G 77/08* (2013.01); *C08G 2261/3324* (2013.01); *C08G 2261/3325* (2013.01); *C08G 2261/418* (2013.01)

(56) References Cited

U.S. PATENT DOCUMENTS

| | | | | |
|---|---|---|---|---|
| 7,566,747 | B2 * | 7/2009 | Moore | B29C 73/22 |
| | | | | 523/210 |
| 8,822,618 | B2 * | 9/2014 | Okawa | C09B 67/0097 |
| | | | | 977/773 |
| 8,865,798 | B2 * | 10/2014 | Merle | B01J 13/18 |
| | | | | 523/205 |
| 10,487,446 | B2 * | 11/2019 | Robertson | C08J 5/243 |
| 10,920,002 | B2 * | 2/2021 | Moore | B29C 64/106 |
| 11,142,662 | B2 * | 10/2021 | Burtovyy | C09D 11/108 |
| 11,230,566 | B2 * | 1/2022 | Burtovyy | C07C 13/68 |
| 11,230,624 | B2 * | 1/2022 | Burtovyy | B01J 31/2278 |
| 11,299,573 | B2 * | 4/2022 | Burtovyy | B29C 64/124 |
| 11,535,702 | B2 * | 12/2022 | Burtovyy | B33Y 70/00 |
| 11,718,710 | B2 * | 8/2023 | Moore | C08F 2/50 |
| | | | | 526/171 |
| 11,753,501 | B2 * | 9/2023 | Moore | C08G 61/08 |
| | | | | 526/171 |
| 11,795,285 | B2 * | 10/2023 | Burtovyy | C08F 232/08 |
| 11,820,839 | B2 * | 11/2023 | Leguizamon | B33Y 10/00 |
| 11,840,586 | B2 * | 12/2023 | Appelhans | C08F 236/20 |
| 12,533,441 | B2 * | 1/2026 | Sottos | A61L 27/22 |
| 2018/0230642 | A1 * | 8/2018 | Robertson | C08G 61/08 |

OTHER PUBLICATIONS

Sangermano, M.; Marchi, S.; Ligorio, D.; Meier, P.; Kornmann, X. Marcomol. Chem. Phys. 2013, 214, 943-947. (Year: 2013).*

JP-2016204428-A (Dec. 8, 2016); machine translation. (Year: 2016).*

Gross E. et al., "Polymer Encapsulated Metallic Nanoparticles as a Bridge Between Homogeneous and Heterogenous Catalysis," Catal. Lett. 2015, vol. 145, pp. 126-138.

Ivanoff, D. et al., "Cross-Linking Agents for Enhanced Performance of Thermosets Prepared via Frontal Ring-Opening Metathesis Polymerization," Macromolecules, 2020, vol. 50, pp. 8360-8366.

Liu, G. and McEnnis, K. "Glass Transition Temperature of PLGA Particles and the Influence on Drug Delivery Applications," Polymers, 2022, vol. 14, pp. 993.

Miller S. and Guironnet, D. "Tunable Latency of Hydrosilylation Catalyst by Ligand Density on Nanoparticle Supports," Angew. Chem. Int. Ed. Engl., 2023, vol. 62, 202214267.

Ramarao, C. et al., "Encapsulation of Palladium in Polyurea Microcapsules," Chem. Commun., 2002, vol. 10, pp. 1132-1133.

Robertson, I. D. et al., "Alkyl Phosphite Inhibitors for Frontal Ring-Opening Metathesis Polymerization Greatly Increase Pot Life," ACS Macro Letters, 2017, vol. 6, pp. 609-612.

Robertson, I. D. et al., "Rapid Energy-Efficient Manufacturing of Polymers and Composites via Frontal Polymerization," Nature, 2018, vol. 557, pp. 223-227.

Rule, J. D. et al., "Wax Protected Catalyst Microspheres for Efficient Self-Healing Materials," Advanced Materials, 2005, vol. 17, pp. 205-208.

Slavik, P. et al., "Organogel Delivery Vehicles for the Stabilization of Organolithium Reagents," Nature Chemistry, vol. 15, pp. 319-325.

Suslick, B. A. et al., "Frontal Polymerizations: From Chemical Perspectives to Macroscopic Properties and Applications," Chemical Reviews, 2023, vol. 123, pp. 3237-3298.

White, S. R. et al., "Autonomic Healing of Polymers Composites," Nature, 2001, vol. 409, pp. 794-817.

* cited by examiner

Hoveyda-Grubbs 2 (HG2)

Polysulfone Encapuslant (PSU)

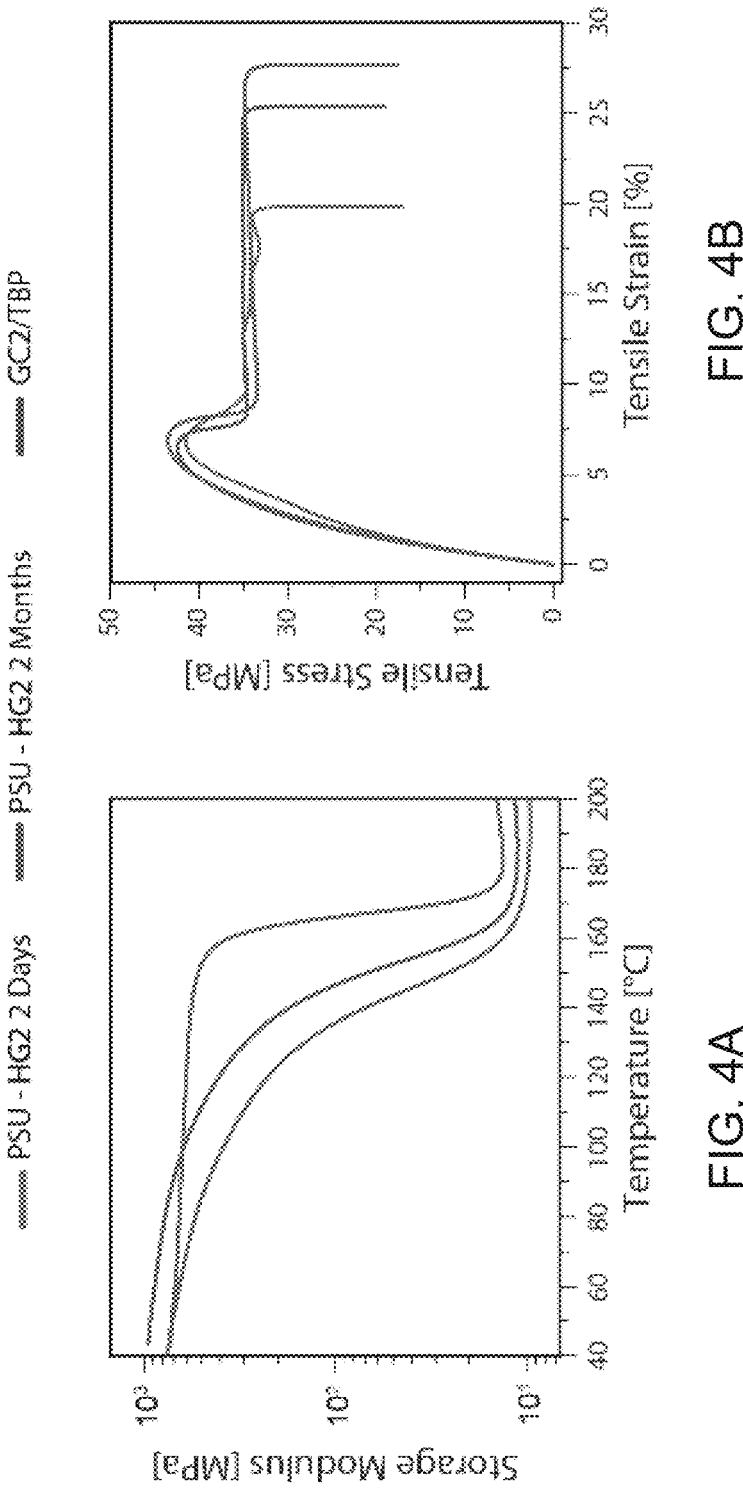

FRONTAL POLYMERIZATION USING ENCAPSULATED CATALYSTS

FEDERALLY SPONSORED RESEARCH AND DEVELOPMENT

This invention was made with Government support under Contract No. DE-NA0003525 awarded by the United States Department of Energy/National Nuclear Security Administration. The Government has certain rights in the invention.

BACKGROUND OF THE INVENTION

Frontal polymerization (FP) is a method of rapidly generating polymeric materials that utilizes the heat generated from an exothermic polymerization to drive the reaction and minimize the amount of external energy needed. See B. A. Suslick et al., *Chem. Rev.* 123 (6), 3237 (2023); I. D. Robertson et al., *ACS Macro Lett.* 6 (6), 609 (2017); D. Bomze et al., *J. Polym. Sci., Part A: Polym. Chem.* 54 (23), 3751 (2016); S. Vyas et al., *Compos. Sci. Technol.* 198, 108303 (2020); N. Chechilo et al., *Dokl. Akad. Nauk SSSR,* 1180 (1972); S. P. Davtyan et al., *Russ. Chem. Rev.* 53 (2), 150 (1984); and M. Moeller and K. Matyjaszewski, Polymer science: a comprehensive reference, Newnes (2012). In FP, local photo- or thermal initiation of a solution containing an energetically dense monomer and a latent but reactive initiator generates a localized, high temperature reaction front. The front propagates through the monomer solution further activating the latent initiator, rapidly converting monomer to polymer. FP has been demonstrated using various polymerization strategies including free-radical, cationic, and ring-opening metathesis polymerization. See C. Nason et al., *Macromolecules* 38(13), 5506 (2005); S. Bynum et al., *J. Polym. Sci., Part A: Polym. Chem.* 57 (9), 982 (2019); S. Chen et al., *Chem. Mater.* 18 (8), 2159 (2006); A. Mariani et al., *J. Polym. Sci., Part A: Polym. Chem.* 42 (9), 2066 (2004); I. D. Robertson et al., *Nature* 557 (7704), 223 (2018); D. G. Ivanoff et al., *Macromolecules* 53 (19), 8360 (2020); and B. A. Suslick et al., *Chem Rev.* 123, 3237 (2023). In all of these systems, highly exothermic polymerization conditions are required to sustain frontal propagation. However, the high energy-density required of FP resins generally correlates inversely with their long-term stability. See B. McFarland et al., *Macromolecules* 39 (1), 55 (2006); S. Fiori et al., *Macromolecules* 36 (8), 2674 (2003); A. Mariani et al., *Macromolecules* 34 (19), 6539 (2001); C. A. Parrinello et al., *J. Polym. Sci., Part A: Polym. Chem.* 50 (12), 2337 (2012); and W. Zhang et al., *Macromolecules* 48 (16), 5543 (2015). Spontaneous polymerization (SP) of highly reactive monomer and catalyst systems lowers the total chemical potential of the resin compared to initial conditions, slowing, or completely preventing frontal propagation under FP conditions. See I. D. Robertson et al., *Nature* 557 (7704), 223 (2018). Thus, SP narrows the processing window for many FP resins and often results in partially cured materials with poor mechanical integrity. See V. Alzari et al., *J. Polym. Sci., Part A: Polym. Chem.* 54 (1), 63 (2016).

Frontal ring-opening metathesis polymerization (FROMP) of dicyclopentadiene generates a high-performance poly(dicyclopentadiene) thermoset, pDCPD, as shown in FIG. 1A, with desirable physicochemical properties. See J. C. Mol, *J. Mol. Catal.* A: Chem. 213 (1), 39 (2004); S Kovačič and C. Slugovc, *Mater. Chem.* Front. 4 (8), 2235 (2020); B. J. Rohde et al., *Polymer* 69, 204 (2015); T. Herink et al., *Polymers* 14 (4), 667 (2022); J.-H. Kim et al., *Compos. B Eng.* 153, 420 (2018); S. C. Leguizamon et al., *ACS Appl. Mater. Interfaces* 14 (45), 51301 (2022); and J. C. Foster et al., *Adv. Sci.* 9 (14), 2200770 (2022). Due to the high reactivity between DCPD and metathesis catalysts, spontaneous thermal initiation and bulk polymerization occurs rapidly at room temperature. For example, initiation occurs instantaneously when using a widely employed ruthenium metathesis catalyst, Grubbs second generation catalyst (GC2). See A. Ruiu et al., *J. Polym. Sci., Part A: Polym. Chem.* 52 (19), 2776 (2014). Thus, chemical strategies to extend resin storage life, defined as the point at which FP can no longer be sustained due to SP, have focused on controlling catalyst reactivity. FIG. 1B is a graph comparing different techniques to lengthen the storage life of DCPD solutions for FROMP, including the encapsulation method of the present invention. Mariani and coworkers demonstrated that a chain transfer agent, i.e., limonene, reduces SP to give a storage life of nearly an hour, albeit at the cost of the mechanical properties of the resultant polymer. See V. Alzari et al., *J. Polym. Sci., Part A: Polym. Chem.* 54 (1), 63 (2016). Similarly, Moore and coworkers found that 2,3-dihydrofuran, which reacts with GC2 to form a persistent Fischer carbene, acts as a potent inhibitor of SP in the formation of deconstructable DCPD thermosets. See O. Davydovich et al., *Chem. Mater.* 34 (19), 8790 (2022). Greater success was achieved using ROMP inhibitors of increasing coordination strength, such as triphenylphosphine, N,N-dimethylamino pyridine, and alkyl phosphites, which extended pot lives to 1 minute, 30 minutes, and 30 hours, respectively. See A. Mariani et al., *Macromolecules* 34 (19), 6539 (2001), A. Ruiu et al., *J. Polym. Sci., Part A: Polym. Chem.* 52 (19), 2776 (2014); and I. D. Robertson et al., *ACS Macro Lett.* 6 (6), 609 (2017). More recent work has demonstrated the utility of thermally latent catalysts, such as bis-N-heterocyclic carbene or S-chelated ruthenium complexes, which exhibited storage lives between 6 hours and two months. See B. A. Suslick et al., *Macromolecules* 55 (13), 5459 (2022); N. Alassad et al, *Catal. Sci. Technol.* 13 (2), 321 (2023); and S. C. Leguizamon et al., *Macromolecules* 55 (18), 8273 (2022). However, the use of these highly-latent catalyst systems generally results in a decrease in the resin reactivity (e.g., decrease in frontal velocity).

An established way to delay the contact between reactive pairs is the encapsulation of molecular cargo in the form of polymer microparticles (PMPs). This well-studied method has been applied to the controlled release of drug molecules, catalyst species, and polymerization initiators. See K. Jelonek et al., *BioMed Res. Int.* 2013, 607351 (2013); C. E. Miles et al., *ACS Appl. Polym. Mater.* 3 (12), 6548 (2021); L. Wu, Chapter 1-Organically Encapsulated Polyoxometalate Catalysts: Supramolecular Composition and Synergistic Catalysis. In *Encapsulated Catalysts*, Sadjadi, S. Ed.; Academic Press, 2017; pp 1-33; E. Gross et al., *Catal. Lett.* 145 (1), 126 (2015); S. A. Miller and D. Guironnet, *Angew. Chem. Int. Ed. Engl.* 62 (5), 202214267 (2023); P. Slavik et al., *Nat. Chem.* 15 (3), 319 (2023); J. D. Rule et al., *Adv. Mater.* 17 (2), 205 (2005); S. R. White et al., *Nature* 409 (6822), 794 (2001); C. Boucher-Jacobs et al., *Nat. Commun.* 9 (1), 841 (2018); S. M. Lee et al., *J. Microencapsul.* 37 (3), 183 (2020); and E. Urdiales and V. A. Volpert, *J. Math. Chem.* 47 (3), 1038 (2010). Work by Pojman et al. demonstrated that microencapsulation of organic peroxide initiators increases the storage life of free-radical acrylate FP. See B. McFarland et al., *Macromolecules* 39 (1), 55 (2006). Extended storage times (>1 day) resulted in significant decreases in mechanical properties of the polymer products and SP still occurred within a two month period.

Therefore, a need remains for an encapsulation strategy for FP systems.

SUMMARY OF THE INVENTION

The present invention is directed to a method for frontal polymerization using encapsulated catalysts, comprising providing a liquid resin comprising a frontal polymerizable monomer, encapsulating a transition metal catalyst in an encapsulating polymer microparticle (PMP), adding the PMP-encapsulated catalyst to the liquid resin, and initiating frontal polymerization of the monomer to generate a polymeric material. The liquid resin can comprise a metathesis-active monomer, such as dicyclopentadiene, norbornadiene, norbornene, oxonorbornene, azanorbornene, cyclobutene, cyclooctene, cyclooctadiene, cyclooctatetraene, or derivatives thereof. The resin can comprise two or more co-polymerizable monomers. The transition metal catalyst can be a ruthenium, tungsten, molybdenum, rhenium, or titanium metathesis catalyst, such as a ruthenium-based Grubbs catalyst. Alternatively, the resin can comprise a hydrosilylation resin and the transition metal catalyst can be a platinum hydrosilylation catalyst, such as Karstedt's catalyst. The encapsulating polymer can preferably be a thermoplastic polymer, such as polysulfone, polylactic acid, polycaprolactone, or polystyrene. In general, the frontally derived polymeric material can be a cured thermoset, or a linear or branched thermoplastic. The liquid resin can further comprise a filler or additive to provide a composite material. For example, frontal polymerization can be initiated with a photo or thermal trigger that locally ignites the reaction.

The microencapsulation strategy of the present invention significantly increases the storage life of FROMP-based resins. By encapsulating widely available Grubbs-type catalysts in commercial thermoplastics (e.g., polysulfone) to make microparticles, DCPD resins remained stable beyond two months without any significant bulk polymerization or decrease in the frontal velocity during FROMP. Successful FROMP was demonstrated using several encapsulated catalysts including HG2, GC2, and HeatMet. Notably, HG2 has never been utilized in FROMP as it is not amenable to chemical inhibition and its high reactivity. Using PSU-HG2 particles, similar FP properties (frontal velocity and maximum temperature) were achieved compared to previous techniques using GC2/phosphite inhibitors. While the glass-transition temperature ($T_g$) of the resulting pDCPD thermosets generated with PSU-HG2 were slightly reduced, the mechanical properties were equivalent to traditional pDCPD thermosets. As another example, the encapsulation technique was further applied to frontal polymerization via hydrosilylation to form silicones using PCI particles containing Karstedt's catalyst. Despite a slow polymerization front, silicone elastomers were successfully synthesized which demonstrates the broad applicability of the encapsulation strategy for FP. Successfully extending the storage life of resins while maintaining the thermomechanical properties of the resulting materials has far reaching implications for aerospace and manufacturing, for example.

BRIEF DESCRIPTION OF THE DRAWINGS

The detailed description will refer to the following drawings, wherein like elements are referred to by like numbers.

FIG. 2A illustrates chemical structures of the catalyst, Hoveyda-Grubbs $2^{nd}$ Generation (HG2), and the encapsulating thermoplastic, polysulfone (PSU), used to make PSU-HG2 PMPs. FIG. 2B are scanning electron microscopy (SEM) images of the microparticles prior to addition to the DCPD mixture.

FIG. 2C show overlaid Fourier transform infrared (FTIR) spectra of periodic aliquots showing no reactivity of the PMP-containing DCPD over the 2-month period. FIG. 2D is a graph of cure profiles of aliquots taken over time from the DCPD mixture containing PSU-HG2 particles at 0.02 mol % catalyst loading. FIG. 2E is a particle size analysis of PMPs extracted from the agitated DCPD solution after 2 days.

FIG. 4A is a graph of representative thermomechanical responses determined via dynamic mechanical analysis of materials produced by the FROMP of DCPD mixtures containing PSU-HG2 particles and stored for 2 days (green) or 2 months (blue) and the traditional GC2/tributylphosphite (TBP) catalyst/inhibitor system (purple) used immediately upon formulation. FIG. 4B is a graph of the stress-strain curves of the same materials.

FIG. 5A is a schematic depicting chemistries between vinyl and hydrosilane functionalized oligomers. FIG. 5B illustrates catalyst and FIG. 5C illustrates thermoplastic encapsulation polymers used for a highly reactive-yet latent-FP system. FIG. 5D shows optical images taken at 40 second intervals after attempted FP of silicone resins with Pt encapsulated in PLA polymer with glass transition temperatures near ($T_g$~60° C.) the reaction temperature when using unencapsulated Pt (75° C.). FIG. 5E shows optical images taken at 40 second intervals after attempted FP of silicone resins with Pt encapsulated in PCI polymer with glass transition temperatures below ($T_m$~35° C.) the reaction temperature (75° C.). A thermochromic black-to-pink dye was added to assist in visualization of the propagating front.

DETAILED DESCRIPTION OF THE INVENTION

The present invention is directed to an encapsulation method to increase the storage life for frontal polymerization systems. In particular, latency in FROMP resins can be achieved via localized separation between monomer and active catalyst that can be removed upon exposure to an external stimulus. For example, encapsulation of Grubbs-type catalysts within PMPs can serve three functions: 1) eliminate spontaneous background polymerization in neat DCPD resins, extending storage life, 2) provide a convenient mechanism for facile catalyst release and subsequent FP, and 3) produce materials with near equivalent thermomechanical properties to those using conventional techniques. As an example, an encapsulation strategy for several ruthenium-alkylidene catalysts is demonstrated that enables successful FROMP of DCPD and extends storage life to over eight months, the longest reported storage life to date. This strategy is readily scalable and consistently generates materials with similar mechanical properties compared to traditional pDCPD thermosets throughout a fully characterized two-month storage time. Frontal polymerization of silicone elastomers with encapsulated platinum catalysts was also demonstrated, indicating the versatility of this encapsulation methodology.

The compatibility of Grubbs catalyst-containing PMPs with DCPD was investigated first. Initially, it was hypothesized that PMPs with thermal transitions (e.g., glass transition, melting) at or below FP temperatures (200-250° C.) would facilitate catalyst release. Thus, commercially available polymers with a wide range of thermal properties, both above and below FP temperatures, were chosen for initial screening with Hoveyda-Grubbs second generation catalyst (HG2), shown in FIG. 2A. HG2 was specifically chosen as it is commonly used for olefin metathesis, commercially available, and highly metathesis-active in neat monomer, but not amenable to chemical inhibition via coordination owing to its unique Hoveyda chelate structure, thus precluding its use in FP. See Y. Takahira and Y. Morizawa, *J. Am. Chem. Soc.* 137 (22), 7031 (2015); I. C. Stewart et al., *Org. Lett.* 9 (8), 1589 (2007); B. H. White and M. L. Snapper, *J. Am. Chem. Soc.* 125 (48), 14901 (2003); and S. Beligny et al., *Angew. Chem. Int. Ed.* 45 (12), 1900 (2006).

Catalyst Encapsulation and Monomer Preparation

Figures 2A, 2B:
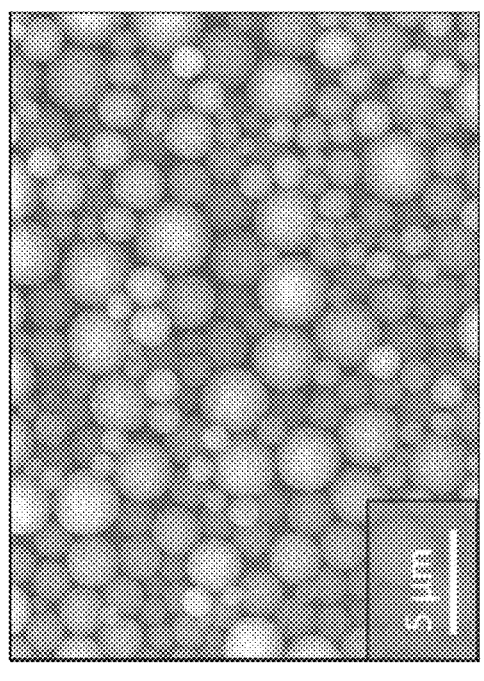
FIGS. 2A-2E show the effect of time and concentration on PMPs in an agitated DCPD mixture.

Polymer microparticles using a thermoplastic as the encapsulating material and ruthenium metathesis catalysts as the active material were prepared using an oil-in-water emulsion solvent evaporation technique. See C. Ramarao et al., *Chem. Commun.* 10, 1132 (2002); and G. Liu and K. McEnnis, *Polymers* 14 (5), 993 (2022). Each aqueous phase was prepared by vigorous mixing of 0.19 g poly(ethylene-alt-maleic anhydride) in 5 mL water until fully dissolved. Each oil phase was prepared by first dissolving 0.125 g of the chosen encapsulating polymer (e.g., polysulfone (PSU), polylactic acid (PLA), polycaprolactone (PCI), polystyrene (PS), etc.) in 1.4 mL dichloromethane (DCM). Each solution was vigorously mixed at room temperature until fully homogenized. Directly prior to emulsification, 17.5 mg of a ruthenium Grubbs catalyst (i.e., HG2, GC2, or HeatMet, a ruthenium catalyst available from Strem Chemicals, Inc.) was added to the DCM solution and gently stirred. Each oil phase was transferred to its corresponding vial containing the aqueous phase. Then, a homogenizer was inserted and operated at medium speed for 90 s to emulsify the given sample. A magnetic stir bar was then added to each emulsion and the DCM allowed to evaporate in air overnight with the stir bar rotation speed set at 1000 RPM. Upon removal of the DCM, each dispersion was transferred into a pre-weighed, 15 mL impact-resistant centrifuge tube, then diluted with water until each reached 15 mL total volume. Each solution was centrifuged down, decanted, filled with fresh DI water, and redispersed. This process was repeated two times to remove as much poly(ethylene-alt-maleic anhydride) as possible. To the last decanted mixture was added 0.5 to 2 mL of DI water. Each dispersion was suspended in liquid nitrogen and then freeze dried to remove all water. This oil/water emulsion templating strategy demonstrated high yields and scalability (89% yield at 5-gram scale). The resulting microparticles are spherical, as shown in FIG. 2B, with 84% catalyst encapsulation efficiency as determined by nuclear magnetic resonance spectroscopy.

Dicyclopentadiene/5-ethylidene-2-norbornene (DCPD/ENB) mixtures were formulated by melting DCPD at 40-50° C. and mixing in a 95/5 wt/wt ratio with ENB. Mixtures for FROMP were prepared by adding the ruthenium catalyst-containing particles to give 0.02 mol % catalyst to DCPD/ENB mixture assuming a catalyst encapsulation efficiency of 100% (i.e., ~8 mg of HG2 encapsulant for 1 g of DCPD/ENB mixture). FROMP was performed in either standard 10 mL glass test tubes or glass slide molds for tensile testing. FP was triggered by applying the tip of a 70 W soldering iron to the surface of the glass until front propagation occurred.

Stability of Encapsulated Catalysts

PMPs containing HG2 were suspended in DCPD at various temperatures and monitored by vial tip test to probe short-term resin stability. The addition of PS-HG2 particles to DCPD at room temperature resulted in instant particle dissolution and resin gelation, despite the high glass transition ($T_g$=100° C.) of the polymer. Similarly, addition of PCI ($T_m$~35° C.) and PLA ($T_g$~60° C.) particles to DCPD resulted in gelation at room temperature within 2 minutes and 2 hours, respectively. By contrast, poly(bisphenol-A-carbonate) ($T_g$~150° C.) and PSU ($T_g$~190° C.) particles containing HG2 remained stably suspended, with no apparent SP, at room temperature in DCPD solutions for at least eight months as determined by negligible changes to the solution viscosity (below 10 MPa s). Increasing the temperatures of PSU-HG2 resins to 60° C. resulted in gelation within minutes. This suggests that catalyst release can occur as a result of increased particle-monomer miscibility at elevated temperatures, well below thermal transition temperatures. To demonstrate this, an eight-month-old suspension of PSU-HG2 PMPs ($T_g$~190° C.) in DCPD was poured into a mold and oven-cured at 100° C. to yield a polymer thermoset.

Figures 2C, 2D:
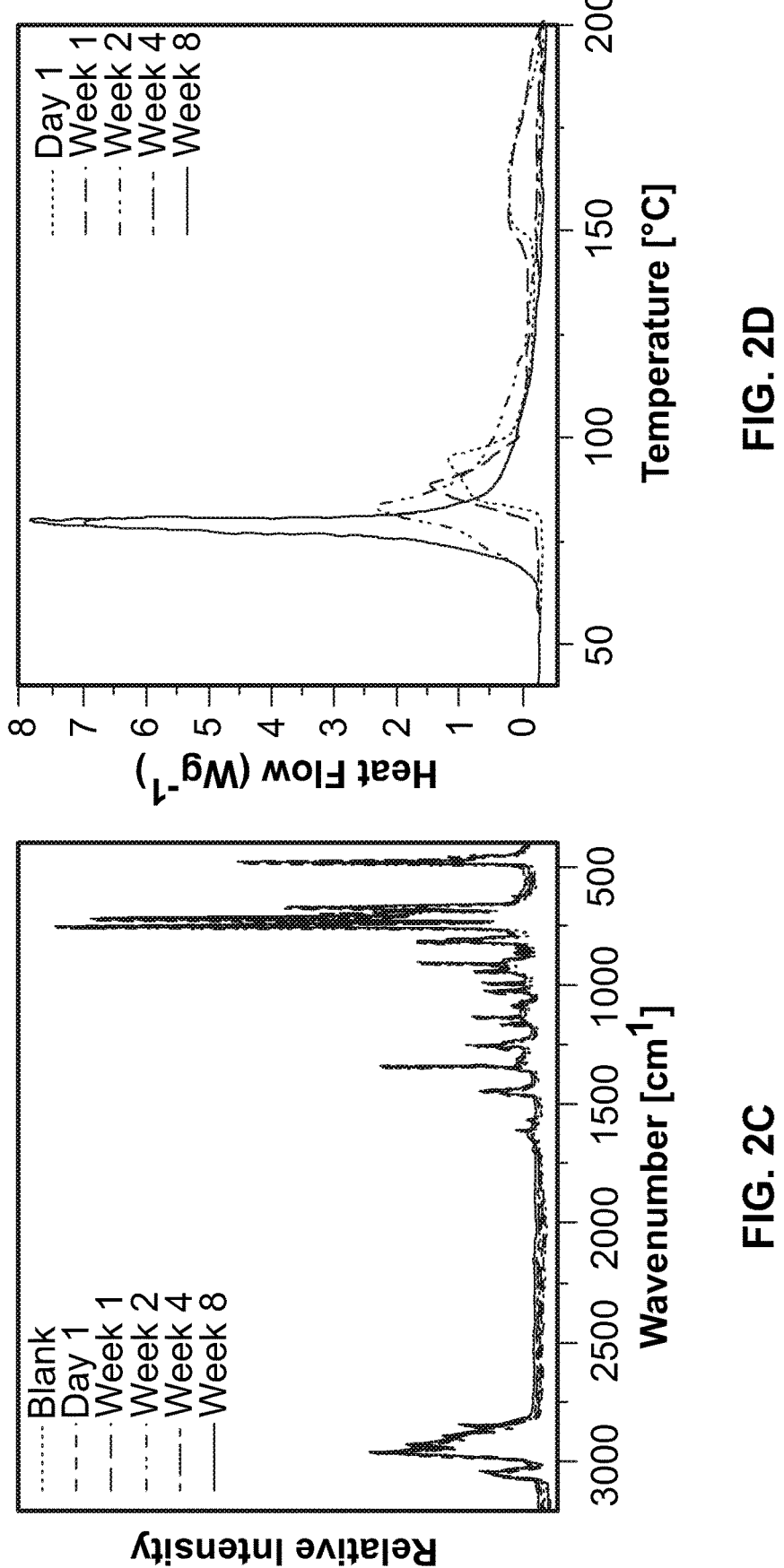
Figures 2E, 2F:
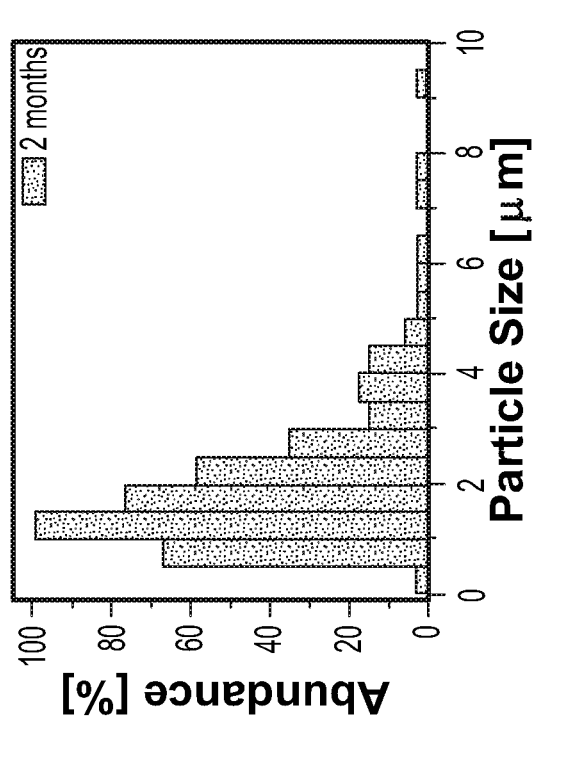
FIG. 2F is a similar particle size analysis after 2 months. Agitation of the DCPD mixture resulted in a reduction of average PMP size.

The long-term stability of the PSU-HG2 particle system was further investigated by monitoring both monomer conversion via Fourier-transform infrared (FTIR) spectroscopy as well as the reaction enthalpy via differential scanning calorimetry (DSC). No discernible changes were observed in the FTIR spectra over the course of two months, as shown in FIG. 2C, indicating that SP did not occur. While the total enthalpy of reaction remains roughly the same (ranging from 320-360 J g$^{-1}$), the heat flow data show significant changes over the course of two months, as shown in FIG. 2D. Initial DSC measurements of the PSU-HG2 suspensions show a broad peak and high onset temperature (~80° C.) of polymerization. Over time, the peak contracts and shifts to lower temperatures. Narrow peaks at lower onset temperatures are attributed to faster catalyst release, a phenomena ascribed to a decrease in the size of the PMPs over the course of two months. Stirring the particles over this time significantly decreased their size from an average of 3 μm to 2 μm, as shown in FIGS. 2E and 2F. While the mechanism of this process is not fully understood, prolonged agitation is expected to reduce particle aggregation or directly break particles into smaller fragments. The change in particle size showed no effect on the resin stability.

Figures 3A, 3B:
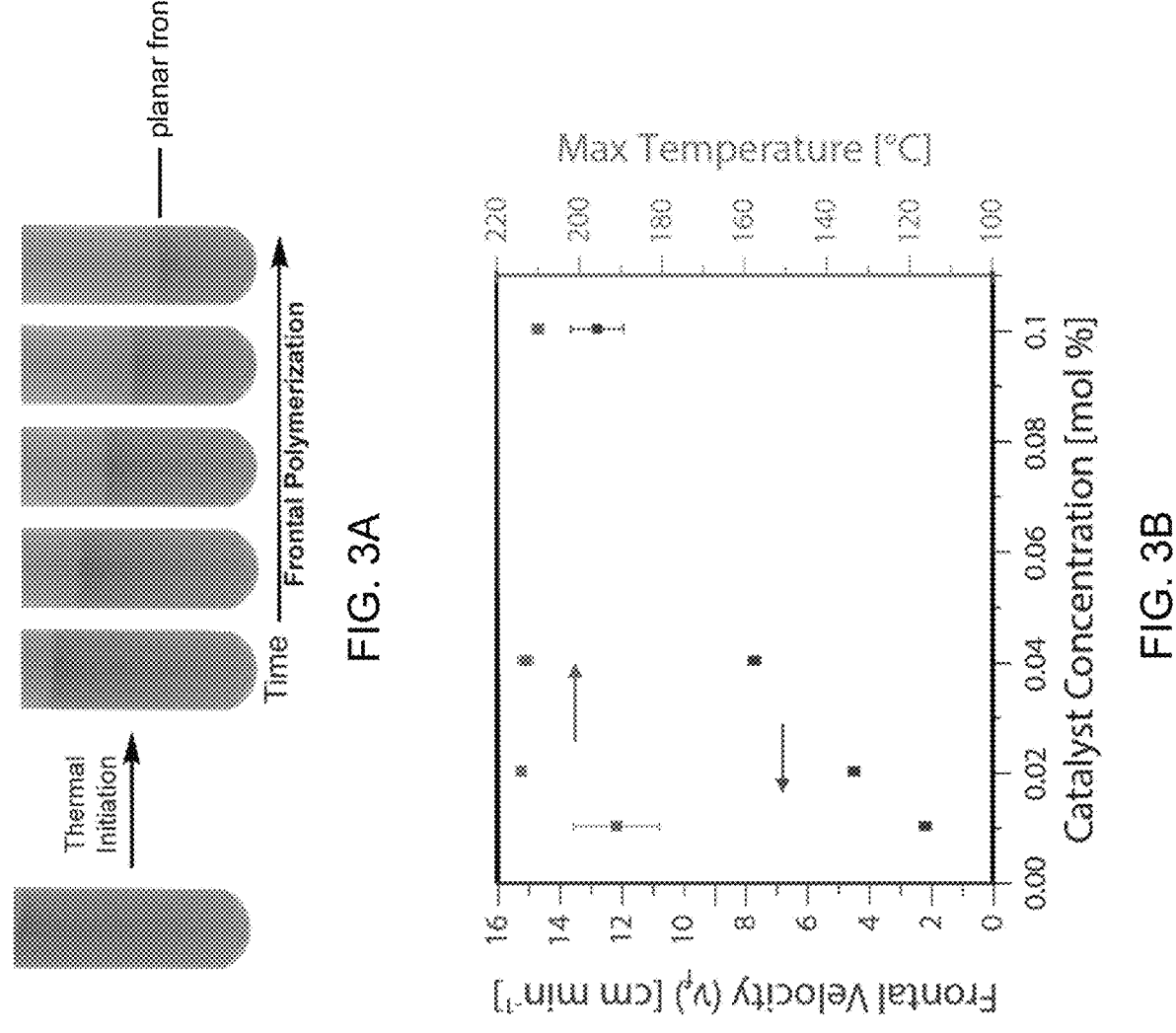
FIG. 3A shows optical images of the time evolution of frontal ring-opening metathesis polymerization of DCPD using HG2 encapsulated in polysulfone at 0.02 mol % catalyst loading.
FIG. 3B is a graph of frontal velocity and maximum front temperature as a function of catalyst concentration. Catalyst concentration was varied by adjusting the loading of PMP in DCPD using a fixed PMP composition. Error bars represent the standard error of 3 samples.

FROMP of DCPD was next attempted with various loadings of PSU-encapsulated HG2. FIG. 3A shows an example of frontal ring-opening metathesis polymerization of DCPD using HG2 encapsulated in polysulfone at 0.02 mol % catalyst loading. FROMP of PSU-HG2 suspensions proceeded smoothly with front velocities ($v_f$=2-13 cm min$^{-1}$) and maximum temperatures ($T_{max}$~190-210° C.), as shown in FIG. 3B. These values are comparable to FP of DCPD smaller particles. Given the differences in $T_g$s, significant changes to the mechanical properties would be expected. However, the tensile properties of pDCPD generated with PSU-HG2 were comparable to those generated with GC2/TBP as indicated in FIG. 4B and Table I.

TABLE I

Figures 1A, 1B:
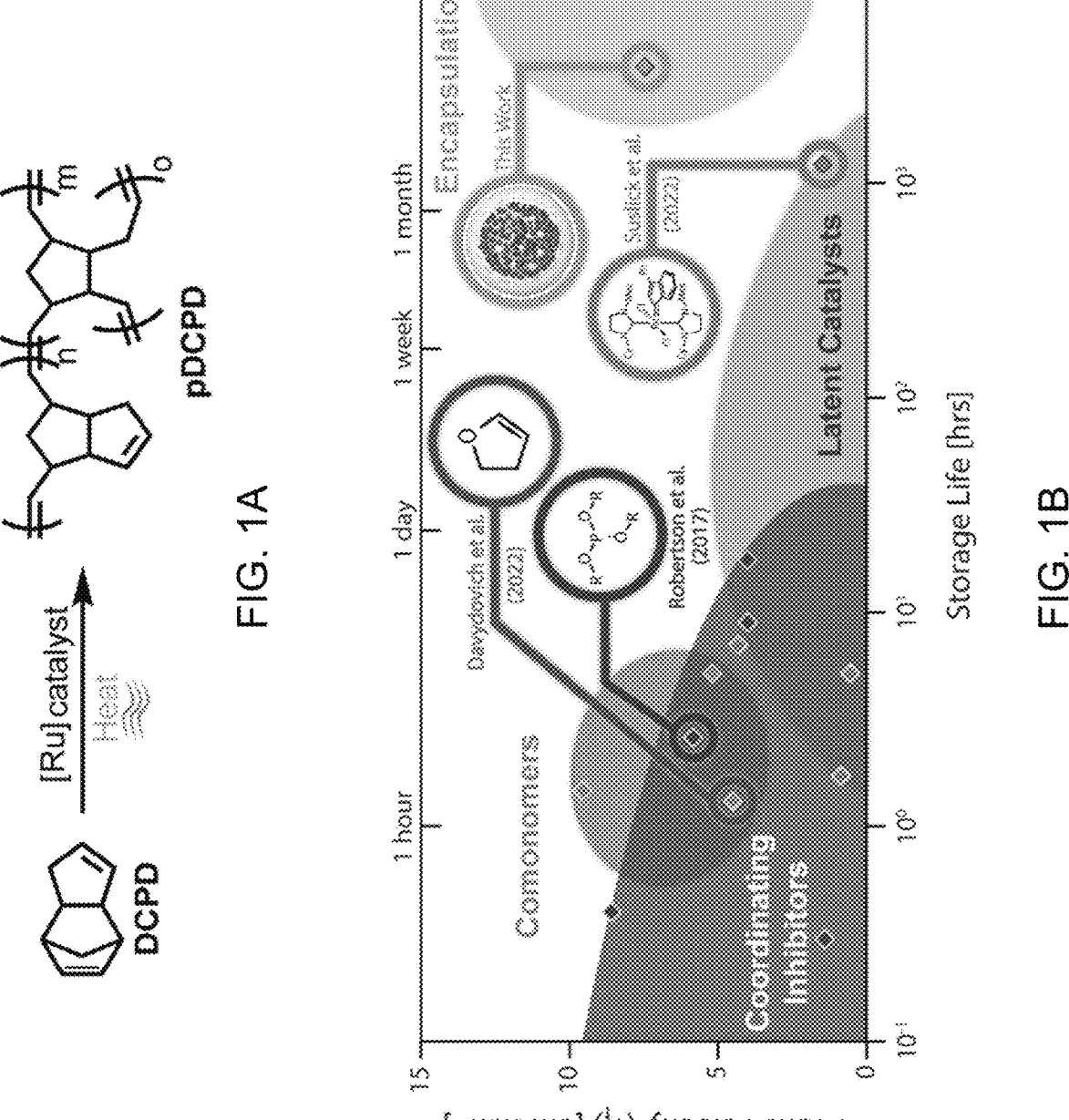
FIG. 1A illustrates a scheme for ROMP of DCPD using a thermally latent catalyst system.
FIG. 1B is a graph comparing different techniques to lengthen the storage life of DCPD solutions for FROMP, including the highly stable encapsulation method of the present invention. See O. Davydovich et al., *Chem. Mater.* 34 (19), 8790 (2022); I. D. Robertson et al., *ACS Macro Lett.* 6 (6), 609 (2017); and B. A. Suslick et al., *Macromolecules* 55 (13), 5459 (2022)

| Monomer conversion and relevant thermomechanical properties of these encapsulated samples. | | | | |
|---|---|---|---|---|
| Sample | Monomer Conversion (%) | Glass Transition Temperature (° C.) | Young's Modulus (GPa) | Ultimate Strength (MPa) |
| PSU-HG2; 2 days | 83.2 ± 6.6 | 151.0 ± 5.5 | 1.61 ± 0.14 | 40.5 ± 1.0 |
| PSU-HG2; 2 months | 95.8 ± 2.1 | 154.4 ± 0.7 | 1.54 ± 1.11 | 41.6 ± 1.1 |
| GC2/TBP | 95.9 ± 1.1 | 167.6 ± 0.2 | 1.54 ± 0.03 | 43.9 ± 0.7 | using GC2/TBP, a well-established benchmark system ($v_f$=1-7 cm min$^{-1}$ and maximum temperatures 200-215° C.), as shown in FIG. 1B. See B. A. Suslick et al., *Chem. Rev.* 123 (6), 3237 (2023); and I. D. Robertson et al., *ACS Macro Lett.* 6 (6), 609 (2017). These encapsulation results represent the first successful example of FROMP using HG2 catalyst. Competition between polymerization and heat loss to endothermic processes is known to delay fronts in FP, as demonstrated by Geubelle and coworkers. See Y. Gao et al., *Small* 17 (42), 2102217 (2021). In this system, polymer swelling and the glass transition are expected to be nominally endothermic processes that do not divert significant thermal energy away from the front. Furthermore, the low loading of PMPs (~0.8 wt %) ensure that negligible heat loss occurs due to the presence of particles.

To explore the effects of encapsulation on initiator latency, FROMP of DCPD was attempted with other PSU-encapsulated Grubbs-type catalysts. Catalysts GC2, Heat-Met, and HeatMet SIPR were chosen for the commercial availability and are listed in increasing order of unencapsulated latency in DCPD. See S. C. Leguizamon et al., *Macromolecules* 55 (18), 8273 (2022); and S. C. Leguizamon et al., *Chem. Mater.* 33 (24), 9677 ((2021). FROMP attempts using PSU-HeatMet SIPr resulted only in local curing. By contrast, DCPD suspensions of PSU-HeatMet and PSU-GC2 successfully underwent FP ($v_f$=0.7 cm min$^{-1}$ and 3.8 cm min$^{-1}$, respectively). Notably, the material generated using PSU-GC2 yielded optically transparent films. The frontal polymerization of cyclooctadiene (COD) using PSU-HG2 was also investigated to demonstrate the modularity of this system. FROMP of COD was successful with a frontal velocity of $v_f$=2.1 cm min$^{-1}$.

Thermochemical and Mechanical Properties of pDCPD Thermosets

The thermochemical and mechanical properties of the resulting pDCPD thermosets was characterized. Dynamic mechanical analysis of pDCPD frontally polymerized using the PSU-HG2 systems, shown in FIG. 4A, demonstrates that the material generated with encapsulated HG2 has a decreased $T_g$ of 151° C. when compared to materials generated with GC2/TBP (167° C.). The decrease in $T_g$ is attributed to the decreased conversion of DCPD to polyDCPD in the encapsulated samples, as shown in Table I, and the minor presence of thermoplastic material. X-ray computed tomography shows the presence of inclusions which are attributed to PSU encapsulant material. Interestingly, the $T_g$ of materials generated after two months of stirring show an increased $T_g$ and a higher degree of DCPD conversion due to more efficient catalyst release from

Encapsulation Strategy for Other Frontal Polymerization Chemistries

Having explored the utility of catalyst encapsulation for FROMP of DCPD, the applicability of this strategy to other types of FP chemistries was investigated. Hydrosilylation, shown in FIG. 5A, was selected as an exemplary chemistry due to its characteristic large exotherms, library of highly active catalysts, and industrial importance. See Y. Nakajima and S. Shimada, *RSC Adv.* 5 (26), 20603 (2015); A. V. Radchenko and F. Ganachaud, *Ind. Eng. Chem. Res.* 61 (23), 7679 (2022); D. Troegel and J. Stohrer, *Coord. Chem. Rev.* 255 (13), 1440 (2011); T. Galeandro-Diamant et al., *Chem. Commun.* 51 (90), 16194 (2015); and R. Y. Lukin et al., *Polymers* 12 (10), 2174 (2020). Furthermore, very few examples of successful frontal hydrosilylation polymerization have been reported in literature. See M. Sangermano et al., *Macromol. Chem. Phys.* 214 (8), 943 (2013).

Hydrosilylation resin was synthesized by vigorously mixing vinyl functional (PLY-7716, an ethoxy functional dimethylsiloxane available from NuSil) and hydride containing (HMS 501, a trimethylsiloxane-terminated methylhydrosiloxane-dimethylsiloxane copolymer available from Gelest) oligomers at a ratio of 2:1 wt: wt to achieve a homogenous solution. To this was added 32 mg of platinum-containing (~2% Pt in xylene) particles per gram of reactive silicone mixture. For the unencapsulated mixture, 3 mg of xylene solution containing Pt was added to provide near equivalent quantities of Pt to the encapsulation method. As the colorless front is difficult to observe, a thermochromic dye (Black to Pink, Atlanta Chemical, 35° C. transition) was mixed with the resin until a black hue was evident (~0.1 wt %)

Figures 5A, 5B, 5C:
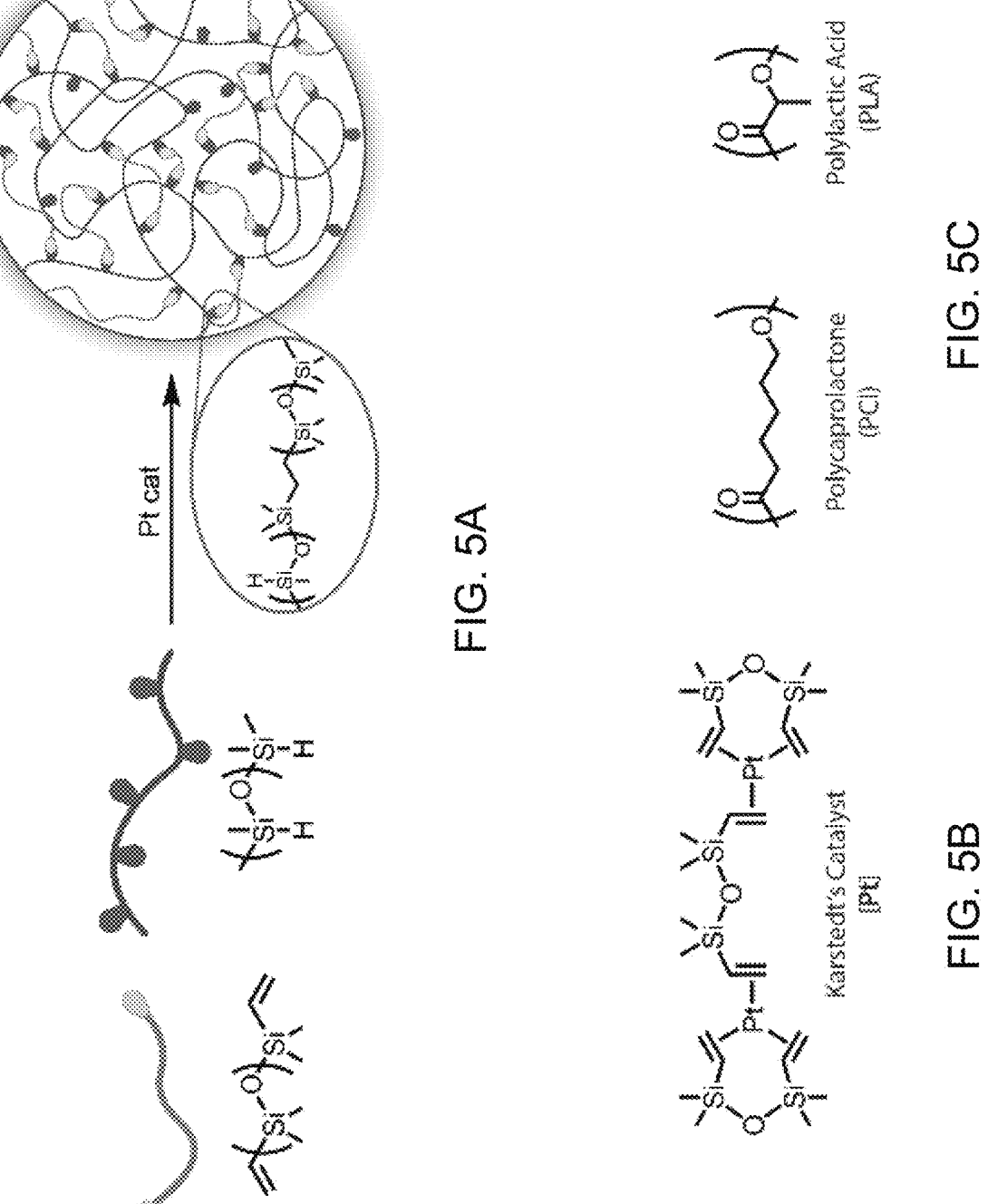
FIGS. 5A-5E illustrate frontal hydrosilylation polymerization using polymer microparticles.
Figures 5D, 5E:
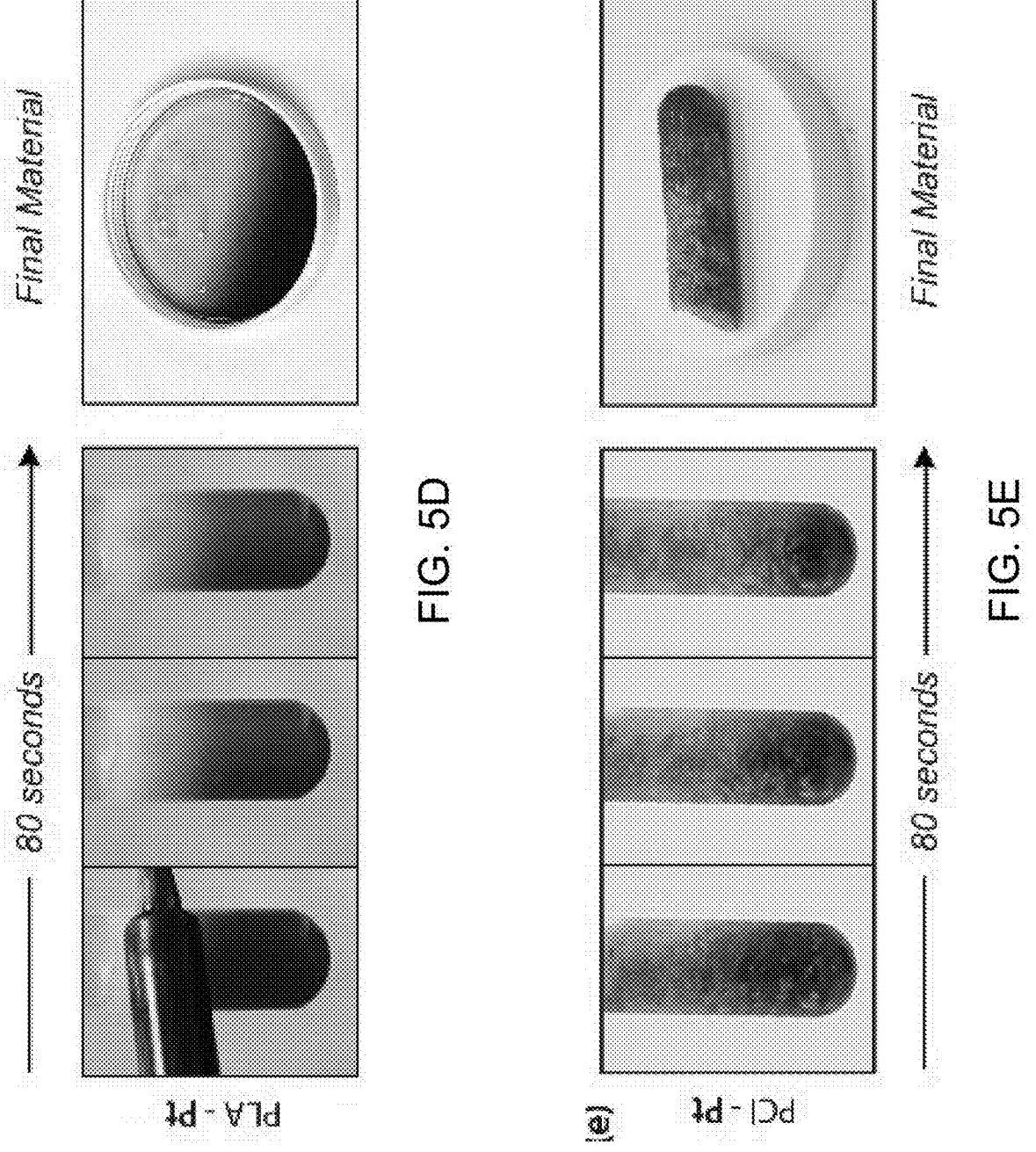

The studies began with characterizations of batch polymerization using Karstedt's catalyst (an organoplatinum compound derived from divinyl-containing disiloxane, shown in FIG. 5B), which was selected for its commercial availability and remarkable activity. Bulk polymerization of commercially available vinyl and hydrosilane functional oligomers produced silicone elastomers at a maximum reaction temperature of 75° C., below the melting temperatures of most of the previously explored encapsulant polymers. These reactions proceeded nearly instantaneously with unencapsulated Pt. The solubility of the encapsulating polymers was poor in these macromonomer reagents, thus it was expected that particle swelling would be insufficient to release catalyst, necessitating a thermally driven phase change. To drive catalyst release, particle encapsulants with low thermal transition temperatures, such as PCI ($T_m$~35° C.) and PLA ($T_g$~60° C.) were selected, as shown in FIG. 5C. Thermal initiation of suspensions of PLA-Pt resulted in local curing but failed to produce a stable front, as shown in FIG. 5D, whereas suspensions using PCI as the encapsulant exhibited successful FP, albeit with slow frontal velocities ($v_f=1.2$ cm min$^{-1}$), as shown in FIG. 5E. In the FROMP systems using PSU-HG2 and DCPD, the low particle loadings and absence of significant endothermic phase transitions have negligible effects on the energy of the front. By contrast, in this hydrosilylation system, relatively high particle loadings (3.2 wt %) and the endothermic phase transition associated with melting absorb some of the exothermic reaction energy generated by the FP, resulting in slow frontal velocities and decreased reaction temperatures (~47° C. with PMPs). Nonetheless, these results demonstrate the versatility of the encapsulation strategy of the present invention for application to other frontal polymerization chemistries.

The present invention has been described as frontal polymerization using encapsulated catalysts. It will be understood that the above description is merely illustrative of the applications of the principles of the present invention, the scope of which is to be determined by the claims viewed in light of the specification. Other variants and modifications of the invention will be apparent to those of skill in the art.

The invention claimed is:

1. A method for frontal polymerization using encapsulated catalysts, comprising:
  providing a liquid resin comprising a frontal polymerizable monomer,
  encapsulating a transition metal catalyst in an encapsulating polymer microparticle (PMP),
  adding a PMP-encapsulated catalyst to the liquid resin, and
  initiating frontal polymerizable frontal polymerization of the monomer to generate a polymeric material.

2. The method of claim 1, wherein the frontal polymerizable monomer comprises a metathesis-active monomer.

3. The method of claim 2, wherein the metathesis-active monomer comprises at least one of dicyclopentadiene, norbornadiene, norbornene, oxonorbornene, azanorbornene, cyclobutene, cyclooctene, cyclooctadiene, cyclooctatetraene, or derivatives thereof.

4. The method of claim 3, wherein the polymeric material comprises poly(dicyclopentadiene).

5. The method of claim 1, wherein the transition metal catalyst comprises a ruthenium, tungsten, molybdenum, rhenium, titanium, or platinum catalyst.

6. The method of claim 5, wherein the ruthenium catalyst comprises a Grubbs catalyst.

7. The method of claim 1, wherein the liquid resin comprises a hydrosilylation resin.

8. The method of claim 7, wherein the transition metal catalyst comprises a platinum hydrosilylation catalyst.

9. The method of claim 8, wherein the platinum hydrosilylation catalyst comprises Karstedt's catalyst.

10. The method of claim 7, wherein the polymeric material comprises a silicone.

11. The method of claim 1, wherein the encapsulating polymer comprises a thermoplastic.

12. The method of claim 11, wherein the thermoplastic comprises polysulfone, polylactic acid, polycaprolactone, or polystyrene.

13. The method of claim 1, wherein the initiating comprises a photo or thermal trigger.

14. The method of claim 1, wherein the liquid resin further comprises a filler or additive.

* * * * *